US011616920B2

(12) United States Patent
Smith

(10) Patent No.: US 11,616,920 B2
(45) Date of Patent: *Mar. 28, 2023

(54) GENERATING SPARSE SAMPLE HISTOGRAMS IN IMAGE PROCESSING

(71) Applicant: Imagination Technologies Limited, Kings Langley (GB)

(72) Inventor: Timothy Smith, London (GB)

(73) Assignee: Imagination Technologies Limited, Kings Langley (GB)

( * ) Notice: Subject to any disclaimer, the term of this patent is extended or adjusted under 35 U.S.C. 154(b) by 220 days.

This patent is subject to a terminal disclaimer.

(21) Appl. No.: 17/157,906

(22) Filed: Jan. 25, 2021

(65) Prior Publication Data

US 2021/0152760 A1 May 20, 2021

Related U.S. Application Data

(63) Continuation of application No. 16/385,610, filed on Apr. 16, 2019, now Pat. No. 10,904,461, which is a (Continued)

(30) Foreign Application Priority Data

Mar. 24, 2016 (GB) ..................................... 1605115

(51) Int. Cl.
G06V 10/00 (2022.01)
H04N 5/347 (2011.01)
(Continued)

(52) U.S. Cl.
CPC .............. H04N 5/347 (2013.01); G06T 7/277 (2017.01); H04N 5/144 (2013.01); H04N 5/351 (2013.01);
(Continued)

(58) Field of Classification Search
CPC ........ H04N 5/347; H04N 5/351; H04N 5/144; H04N 5/2351; G06T 5/40; G06T 5/002;
(Continued)

(56) References Cited

U.S. PATENT DOCUMENTS 5,600,574 A * 2/1997 Reitan ................ H04N 1/00015
702/185
6,985,628 B2 * 1/2006 Fan ...................... G06V 30/413
382/165
(Continued)

FOREIGN PATENT DOCUMENTS

| CN | 101216942 A | 7/2008 |
| CN | 101295486 A | 10/2008 |
| CN | 105023258 A | 11/2015 |

OTHER PUBLICATIONS

Hall et al., "On The Accuracy of Binned Kernel Density Estimators," Journal of Multivariate Analysis, Mar. 1994, pp. 165-184.
(Continued)

Primary Examiner — Amir Alavi
(74) Attorney, Agent, or Firm — Potomac Law Group, PLLC; Vincent M DeLuca

(57) ABSTRACT

Apparatus for binning an input value into an array of bins, each bin representing a range of input values and the bins collectively representing a histogram of input values, the apparatus comprising: an input for receiving the input value; a memory for storing the array; and a binning controller configured to: derive a plurality of bin values from the input value according to a binning distribution located about the input value, the binning distribution spanning a range of input values and each bin value having a respective input value dependent on the position of the bin value in the binning distribution; and allocate the plurality of bin values
(Continued)

to a plurality of bins in the array, each bin value being allocated to a bin selected according to the respective input value of the bin value.

20 Claims, 5 Drawing Sheets

Related U.S. Application Data continuation of application No. 15/468,493, filed on Mar. 24, 2017, now Pat. No. 10,306,161.

(51) Int. Cl.
*G06T 7/277* (2017.01)
*H04N 5/14* (2006.01)
*H04N 5/351* (2011.01)

(52) U.S. Cl.
CPC ............... *G06T 2207/20021* (2013.01); *G06T 2207/20081* (2013.01)

(58) Field of Classification Search
CPC ....... G06T 5/009; G06T 7/277; G06K 9/6215; G06K 9/00335; G06F 17/30991
See application file for complete search history.

(56) References Cited

U.S. PATENT DOCUMENTS

| | | | |
|---|---|---|---|
| 6,996,277 B2* | 2/2006 | Fan | G06V 30/413 382/190 |
| 7,376,263 B2 | 5/2008 | Kim et al. | |
| 7,454,058 B2 | 11/2008 | Porikli | |
| 8,831,716 B2 | 9/2014 | Hatlestad et al. | |
| 8,868,474 B2* | 10/2014 | Leung | G06F 11/30 706/12 |
| 8,970,739 B2 | 3/2015 | Webb | |
| 9,001,200 B2* | 4/2015 | Breniman | G06T 7/0012 348/79 |
| 9,439,580 B2 | 9/2016 | Hatlestad et al. | |
| 9,858,472 B2* | 1/2018 | Ming | G06V 40/172 |
| 10,306,161 B2* | 5/2019 | Smith | H04N 5/351 |
| 10,346,728 B2* | 7/2019 | Fu | G06V 30/194 |
| 10,580,175 B2* | 3/2020 | de Waele | G06T 11/206 |
| 10,711,590 B2* | 7/2020 | Hay | G01V 5/06 |
| 11,282,695 B2* | 3/2022 | Xu | G06N 3/0454 |
| 2003/0035579 A1 | 2/2003 | Yang et al. | |
| 2010/0103187 A1 | 4/2010 | Linssen | |
| 2013/0188827 A1 | 7/2013 | Choi et al. | |
| 2013/0329076 A1 | 12/2013 | Shaw | |
| 2014/0205157 A1 | 7/2014 | Suzuki | |
| 2016/0179852 A1 | 6/2016 | Naibo et al. | |
| 2017/0277941 A1 | 9/2017 | Smith | |
| 2017/0287122 A1 | 10/2017 | Lee | |
| 2022/0265149 A1* | 8/2022 | Lee | A61B 5/0205 |

OTHER PUBLICATIONS

Hardle, "Implementation in Smoothing Techniques," S. Springer Series in Statistics; Springer Verlag; pp. 67-68.
Raykar et al., "Fast Computation of Kernel Estimators," Journal of Computational and Graphical Statistics, vol. 19, No. 1, Jan. 2010, pp. 205-220.
Van Kerm, "Adaptive Kernel Density Estimation," 9th UK Stata Users Meeting, Royal Statistical Society, London, May 2003, pp. 1-3.
Elgammal et al., "Background and Foreground Modeling Using Non-Parametric Kernel Density Estimation for Visual Surveillance," Proceedings of the IEEE, vol. 90, No. 7, Jul. 2002, pp. 1151-1163.
Kolawole et al., "Robust Foreground Detection in Videos Using Adaptive Color Histogram Thresholding and Shadow Removal," Network and Parallel Computing, Lecture Notes in Computer Science, Springer International Publishing, Sep. 2011, pp. 496-505.
Zhong et al., "Local Spatial Co-Occurrence for Background Subtraction via Adaptive Binned Kernel Estimation," Computer Vision, ACCV 2009, Springer Bedin, Sep. 2009, pp. 152-161.
Zhong et al., "Robust Tracking via Patch-Based Appearance Model and Local Background Estimation," Neurocomputing, vol. 123, Aug. 2013, pp. 344-353.
Calonder et al., "BRIEF: Binary Robust Independent Elementary Features," ECCV '10 Proceedings of the 11th European Conference on Computer Vision, Part IV, Sep. 2010, pp. 778-792, Heraklion, Greece.
Goyette et al., "Changedetection.net: A New Change Detection Benchmark Dataset," IEEE Conference on Computer Vision and Pattern Recognition, TR2012-044, Jun. 2012.
Heikkila et al., "A Texture-Based Method for Modeling the Background and Detecting Moving Objects," IEEE Transactions on Pattern Analysis and Machine Intelligence, vol. 28, No. 4, May 2006, pp. 857-862.
(Note: above NPL in parent application).

* cited by examiner

GENERATING SPARSE SAMPLE HISTOGRAMS IN IMAGE PROCESSING

BACKGROUND OF THE INVENTION

This invention relates to apparatus for generating a histogram of input values and to a method of binning input values so as to generate such a histogram.

The processing pipelines of digital cameras commonly make use of histograms to summarise the frequency distribution of parameters captured by pixels of the camera sensor such as exposure or colour channel parameters. A histogram divides the range of possible input values of a parameter into a series of bins, with each bin representing a count of the number of pixels having a parameter falling within the respective range of that bin. Such histograms can be used by the image processing algorithms of the pipeline in order to perform control functions of the camera such as auto-exposure, auto-focus and auto-white balance. A camera sensor will generally include many millions of pixels and the use of such histograms helps to provide a summary of the characteristics of a captured frame at a level of detail which is appropriate and manageable by pipeline algorithms.

BRIEF SUMMARY OF THE INVENTION

According to a first aspect of the present invention there is provided apparatus for binning an input value into an array of bins, each bin representing a range of input values and the bins collectively representing a histogram of input values, the apparatus comprising:
   an input for receiving the input value;
   a memory for storing the array; and
   a binning controller configured to:
      derive a plurality of bin values from the input value according to a binning distribution located about the input value, the binning distribution spanning a range of input values and each bin value having a respective input value dependent on the position of the bin value in the binning distribution; and
      allocate the plurality of bin values to a plurality of bins in the array, each bin value being allocated to a bin selected according to the respective input value of the bin value.

The binning distribution may be centred on the input value.

The binning distribution may be a Gaussian distribution or an approximation thereto.

The input value may be an image characteristic derived from one or more pixels of an image frame.

The binning controller may be configured to select the span of the binning distribution according to one or more predefined or adaptive parameters.

The binning controller may be configured to select the span of the binning distribution in dependence on a measure of the sparsity of the histogram represented by the array of bins.

The binning controller may be configured to, prior to allocating each of the plurality of bin values to its respective bin, decay the values held at the array of bins according to a predefined decay factor.

The binning controller may be configured to derive the plurality of bin values from the input value by scaling the binning distribution by the input value, each of the bin values being the scaled height of the binning distribution at the respective bin of the array.

The binning controller may be configured to normalise the histogram such that the bins of the array sum to 1.

Each bin of the array may have a width equal to a unit of the input value.

The input value may be received at the input expressed as a plurality of component values.

According to a second aspect of the present invention there is provided a data processing device for detecting a change in a sequence of input values, the data processing device comprising:
   apparatus as described herein and configured to generate the histogram of input values by binning a plurality of input values of the sequence into the array of bins; and
   change detection logic configured to use the histogram to estimate the likelihood of the received input value and generate a measure of change in the input values in dependence on the estimated likelihood.

The estimated likelihood may represent a measure of probability of the received input value occurring given the frequency distribution of input values represented by the histogram.

The change detection logic may be configured to form the measure of probability in dependence on the value of the bin in the array corresponding to the received input value.

The change detection logic may be configured to derive a normalised histogram from the bins of the array and use the value of the bin of the normalised histogram which corresponds to the received input value as the measure of probability.

The change detection logic may be configured to derive the normalised histogram such that the bins of the histogram sum to 1.

The change detection logic may be configured to generate the measure of change in the input values by comparing the estimated likelihood to a predefined or adaptive threshold.

The measure of change may be indicative of a change in the sequence of input values if the estimated likelihood exceeds the predefined or adaptive threshold.

The change detection logic may be configured to form the adaptive threshold by summing the bins in order of decreasing value and identifying a threshold bin at which that sum first exceeds a predefined total, and to derive the adaptive threshold in dependence on the value of the threshold bin.

The input values may be image characteristics received for a block of pixels of a frame and the data processing device is for detecting motion in the block of pixels.

The indication of change may be a binary value identifying whether or not the estimated likelihood is indicative of change in the sequence of input values.

The input value may be one or more of luminance, hue, lightness, brightness, chroma, colorfulness, saturation, or a measure of variation therein.

According to a third aspect of the present invention there is provided a method of binning an input value into an array of bins, each bin representing a range of input values and the bins collectively representing a histogram of input values, the method comprising:
   receiving an input value;
   deriving a plurality of bin values from the input value according to a binning distribution located about the input value, the binning distribution spanning a range of input values and each bin value having a respective input value indicated by the position of the bin value in the binning distribution; and
   allocating the plurality of bin values to a plurality of bins, each bin value being allocated to a bin selected according to the respective input value of the bin value.

The method may further comprise, prior to allocating each of the plurality of bin values to its respective bin, decaying the values held at the array of bins according to a predefined decay factor.

The deriving the plurality of bin values from the input value may comprise scaling the binning distribution by the input value, each of the bin values being the scaled height of the binning distribution at the respective bin of the array.

The method may comprise:
  binning a plurality of input values of the sequence into the array of bins so as to generate the histogram of input values;
  using the histogram to estimate the likelihood of the received input value; and
  in dependence on the estimated likelihood, generating a measure of change in the input values.

The estimated likelihood may represent a measure of probability of the received input value occurring given the frequency distribution of input values represented by the histogram.

The using the histogram may comprise forming the measure of probability in dependence on the value of the bin in the array corresponding to the received input value.

The using the histogram may comprise deriving a normalised histogram from the bins of the array and using the value of the bin of the normalised histogram which corresponds to the received input value as the measure of probability.

The generating a measure of change may comprise comparing the estimated likelihood to a predefined or adaptive threshold.

The measure of change may be indicative of change in the sequence of input values if the estimated likelihood exceeds the predefined or adaptive threshold.

The method may further comprise forming the adaptive threshold by:
  summing the bins in order of decreasing value so as to identify a threshold bin at which that sum first exceeds a predefined total; and
  deriving the adaptive threshold in dependence on the value of the threshold bin.

The apparatus may be embodied in hardware on an integrated circuit. There may be provided a method of manufacturing, at an integrated circuit manufacturing system, the apparatus. There may be provided an integrated circuit definition dataset that, when processed in an integrated circuit manufacturing system, configures the system to manufacture the apparatus. There may be provided a non-transitory computer readable storage medium having stored thereon a computer readable description of an integrated circuit that, when processed in an integrated circuit manufacturing system, causes the integrated circuit manufacturing system to manufacture the apparatus.

There may be provided an integrated circuit manufacturing system comprising:
  a non-transitory computer readable storage medium having stored thereon a computer readable integrated circuit description that describes the apparatus;
  a layout processing system configured to process the integrated circuit description so as to generate a circuit layout description of an integrated circuit embodying the apparatus; and
  an integrated circuit generation system configured to manufacture the apparatus according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

BRIEF DESCRIPTION OF THE DRAWINGS

The present invention will now be described by way of example with reference to the accompanying drawings. In the drawings.

DETAILED DESCRIPTION OF THE INVENTION

The following description is presented by way of example to enable a person skilled in the art to make and use the invention. The present invention is not limited to the embodiments described herein and various modifications to the disclosed embodiments will be apparent to those skilled in the art.

One example of the use of histograms is for performing motion detection in a sequence of frames captured by a camera sensor. For example, this can be a useful feature in security cameras since it allows the camera to flag up periods of motion in a video feed or to only record or transmit the captured video stream when motion is detected. It is often the case that very limited resources are available in camera hardware or associated processing equipment to perform motion detection and/or it is desired that motion detection is performed at low power. As a result, frames captured by a camera sensor are typically downsampled (e.g. from HD to VGA resolution) and motion detection performed in the downsampled frames at a low frame rate (e.g. at 10-15 frames per second rather than the, say, 30 frames per second provided by the camera sensor).

In order to further reduce the processing burden, frames are typically divided into a set of blocks in respect of which motion detection is performed, with each block comprising a plurality of pixels of the frame. To facilitate motion detection processing (and potentially other image processing functions) on a per-block basis, a camera pipeline may generate histograms for each block representing the frequency distribution of image parameters within a block and potentially over several frames. For example, a histogram may be generated representing a typical measure of luminance for a block and motion may be identified in that block by looking for a sudden change in the luminance of the block which is indicative of motion.

Figure 2:
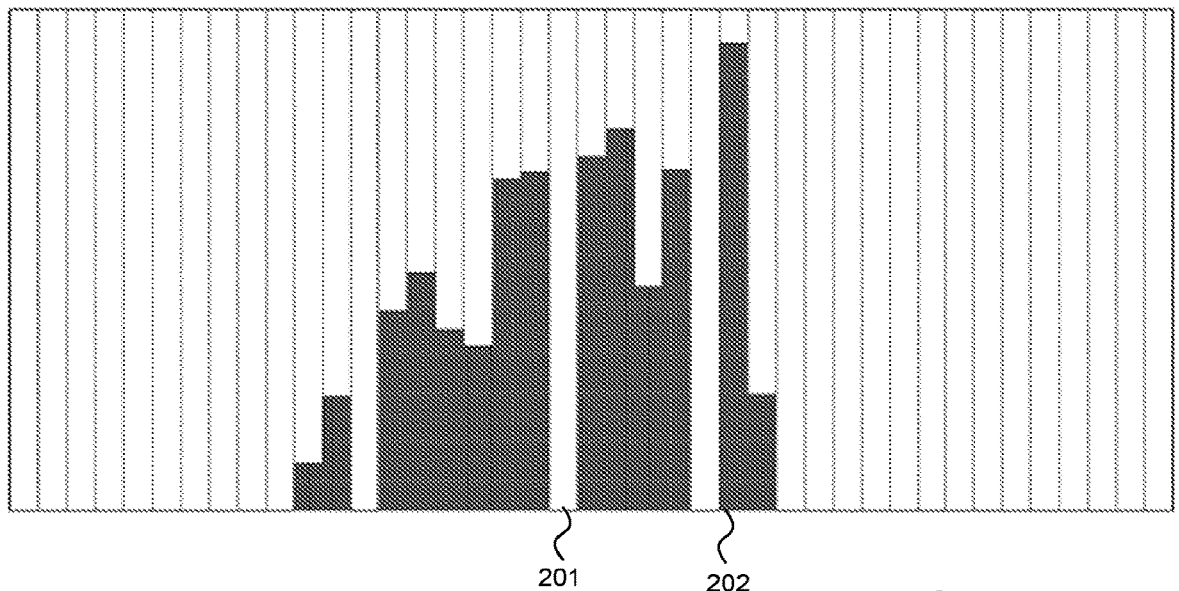
FIG. 2 illustrates a sparse histogram formed by binning into a single bin each luminance value formed in respect of a block of a frame.

However, the use of a limited number of pixels or sampling points per block for a parameter and/or the use of narrow bins and/or the use of a low frame rate can lead to a sparsely-populated histogram being generated for a block, i.e. a histogram having a substantial proportion of empty bins and gaps in the histogram distribution. Such a histogram may be termed a sparse histogram. An example of a sparse histogram is shown in FIG. 2.

Sparse histograms tend to be a poor quality representation of the underlying frequency distribution for a parameter. Sparse histograms may be filtered before use in order to form an improved estimate of the underlying frequency distribution for the parameter represented by the histogram. Such filtering is typically performed so as to generate a denser histogram to produce a smoothed distribution without significant gaps. Filtering sparse histograms in this manner requires an additional processing step and can result in a loss of fidelity (e.g. attenuation of intermediate peaks in multi-modal distributions).

Apparatus and methods are described for generating a histogram of an input value which are particularly suitable for use with a sparse dataset of input values. In the examples described herein, the apparatus and methods relate to the performance of motion detection in a sequence of image frames. Generally, the apparatus and methods may be for generating a histogram of any input value for any purpose, including for generating a histogram of any image characteristic received from a camera sensor or pipeline and for generating a histogram of any audio characteristic received from an audio source. Apparatus and methods configured as described herein may be configured for the purpose of detecting a change in the input values: such change detection is not limited to the performance of motion detection in a sequence of image frames. It will be appreciated that any of the examples, features or functions described below with respect to generating a histogram of a particular image characteristic (e.g. luminance or its standard deviation) may be generally applied to the generation of a histogram for any other image characteristic, audio characteristic, or other input value from any source and for any purpose, not limited to motion detection.

Aspects of the present invention will now be described by way of example with respect to the apparatus shown in FIG. 1 for performing motion detection in a sequence of video frames captured at a camera.

Figure 1:
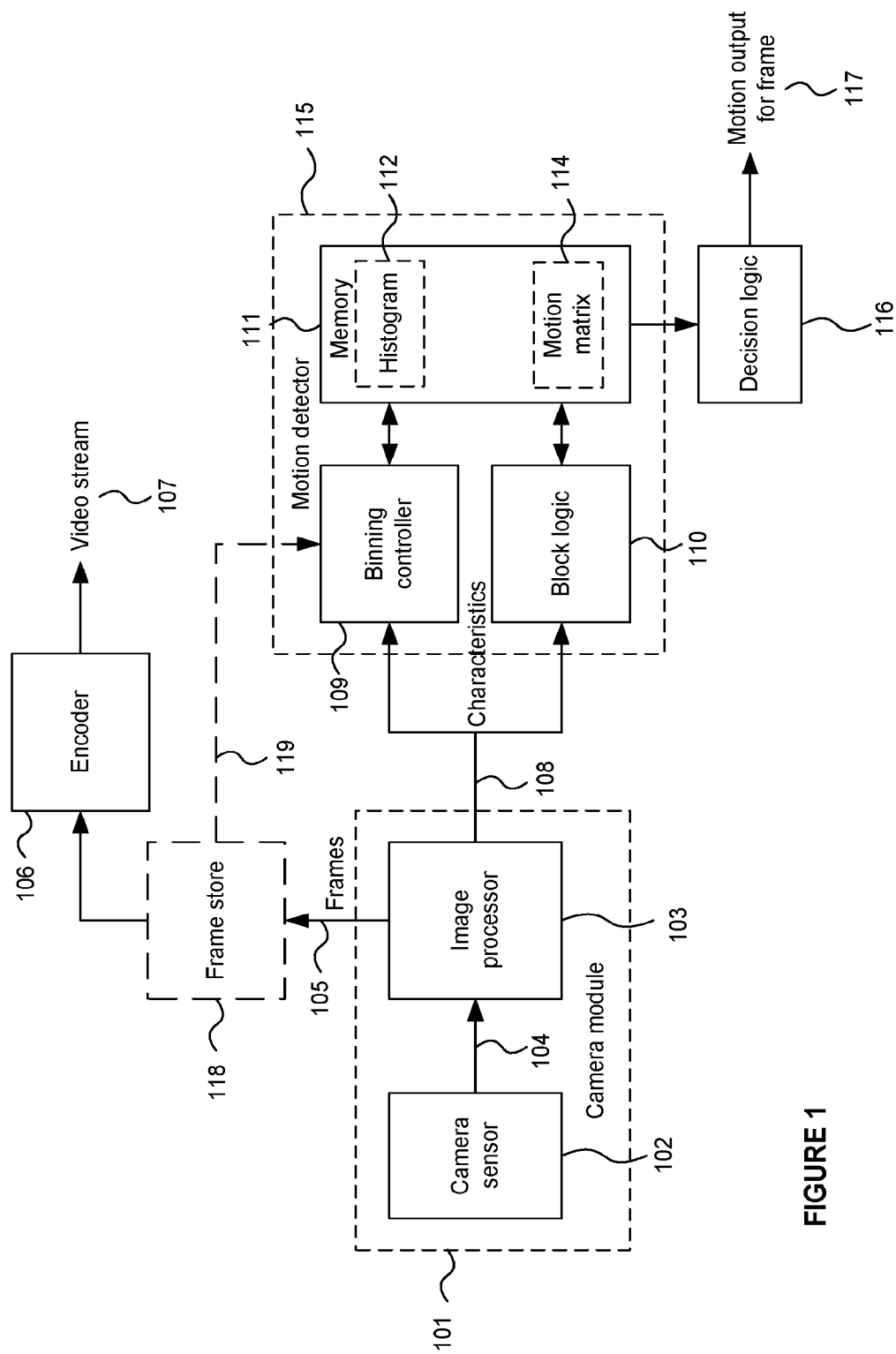
FIG. 1 is a schematic diagram of apparatus for performing motion detection in a stream of video frames captured at a camera.

FIG. 1 is a schematic diagram of apparatus which includes a camera module 101 and a motion detector 115. The camera module 101 comprises a camera sensor 102 which is arranged to provide frames to an image processor 103. The image processor 103 may generate various image characteristics for use at the motion detector and potentially other processing units on or outside the camera pipeline.

For example, the image processor may gather statistics for use at auto white balance and auto exposure functions of a camera pipeline. The image processor is configured to provide image characteristics for one or more blocks of a frame. For example, each frame may be divided into a set of 16 blocks, with the image processor generating image characteristics in respect of each of the blocks.

A block may be part or all of a frame and any given block may or may not overlap with other blocks of the same frame. A block may be any collection of one or more pixels of a frame and may take any shape. The pixels of a block may or may not be contiguous within a frame. One or more pixels of a frame may not belong to any block defined for the frame. Any given pixel of a frame may belong to one or more blocks.

The image processor may be configured to generate image characteristics independently for one or more of the colour channels of an image frame (e.g. for each of the red, green and blue channels in the case of an RGB image captured at the camera). A measure of luminance provided by the image processor may be provided as a set of colour components or other image characteristics for interpretation at the motion detector as a measure of luminance.

Figure 4:
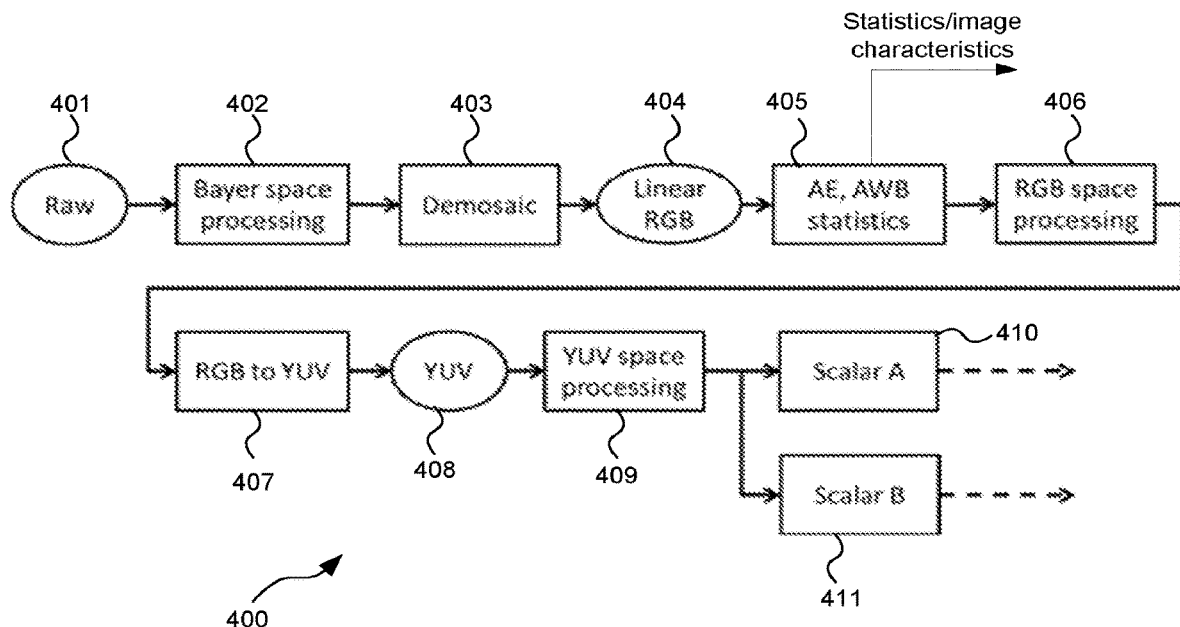
FIG. 4 is a flowchart illustrating processing which may be performed at an image processor.

A flowchart 400 illustrating an exemplary operation of the image processor 103 is shown in FIG. 4. The image processor receives a raw image 401 (of input stream 104) from the camera sensor 102 and performs Bayer space processing 402 and demosaicing 403 of the image. At 404 the image processor converts the raw image into an RGB image on which the image processor calculates statistics 405 for use at auto exposure and auto white balance functions of the camera pipeline (not shown). These statistics may be included in the image characteristics 108 provided to the motion detector 115. The image processor may additionally perform further RGB space processing 406, such as colour correction. The image processor converts the RGB image frame into the YUV colour space 407 so as to generate a YUV image frame 408, on which YUV space processing 409 may be performed (e.g. contrast enhancement). The resulting YUV frames may be provided at one or more different scales 410, 411 according to the requirements of subsequent units taking their input from the image processor, such as encoder 106. In this example, scalar 410 may correspond to the stream of frames 105 provided to the encoder 106 for encoding into a video stream 107. Encoder 106 may receive frames via a frame store 118 at which frame data from the camera sensor, potentially processed by the image processor 103, may be stored. In some examples, the motion detector may receive a stream of frames from the image processor 103 (e.g. scalar 411).

Image processing may be performed by image processor 103 at a lower resolution than that captured by the camera sensor. For example, the camera sensor may be a HD sensor but image processing may be performed at, say, VGA resolution (640×480 pixels). Lower resolutions such as VGA are typically sufficient for the purpose of generating statistics for motion detection and reduces the processing capabilities required of the image processor and/or allows image processing to be performed at low power. In some examples, the image frames captured by the camera sensor may be downscaled before being provided to the image processor, with the camera sensor providing full resolution frames directly to the encoder 106 (possibly via data store 118 and/or another unit, e.g. to convert raw frames into YUV frames). The image processor may be configured to provide image characteristics describing one or more blocks of each frame for use at the motion detector but not the image frames themselves.

The arrangement of camera module 101 shown in FIG. 1 is merely one possibility and it will be appreciated that various other arrangements of a camera module are possible. In particular, the presence or otherwise of encoder 106 is not relevant to the operation of motion detector 115 and is included merely for illustrative purposes. The camera module 101 need only provide image characteristics 108 for the motion detector which are sufficient for the motion detector to form an output indicative of motion at a block. The image characteristics 108 may comprise one or more different types of image characteristics, such as exposure information and colour information for one or more colour channels. In other examples the camera module 101 may be any other source of image characteristics 108 for use at the motion detector (e.g. module 101 may derive image characteristics from stored image frames).

In examples of the present invention, the image processor may provide a measure of luminance for each block of a frame as an input value for the motion detector. This could be a measure of average luminance over two or more pixels of a block, a measure of luminance of a randomly selected or predetermined pixel of a block, or any other measure of luminance associated with a block. The measure of luminance in this case represents an image characteristic 108 on the basis of which motion detection is performed. The measure of luminance may be provided in any suitable manner. For example, a luma value may be used as a measure of luminance for one or more pixels of a block (e.g. a luma component of a YUV colour space), or a measure of luminance for a block could comprise one or more individual colour components each expressing an average value of the respective colour component fora block.

Binning controller 109 is configured to, for each block, maintain a histogram representing an expected distribution of luminance for the block based on image characteristics 108 received over time for the block (e.g. in respect of a plurality of frames). Each bin of the histogram represents a range of luminance values. The range of each bin may be a single luminance value. For example, in the case of luminance expressed as a luma value in the range 0 to 255, the histogram may comprise 256 bins with each luminance value being allocated to its respective bin by the binning controller. In other examples, each bin may correspond to multiple bin values. The width of bins may vary over the possible range of input values to the histogram.

The binning controller 109 is configured to maintain the histogram by, on receiving a luminance input value for a block from the image processor, decaying the bin values of the histogram maintained for that block and allocating the received luminance value to its corresponding bin. Each bin may be a counter such that, on allocating a luminance value to a bin, the binning controller 109 is configured to increment the count value of the counter corresponding to that bin by some predetermined value (e.g. one). In this manner, a summary of the frequency distribution of the input values is formed.

Figure 6:
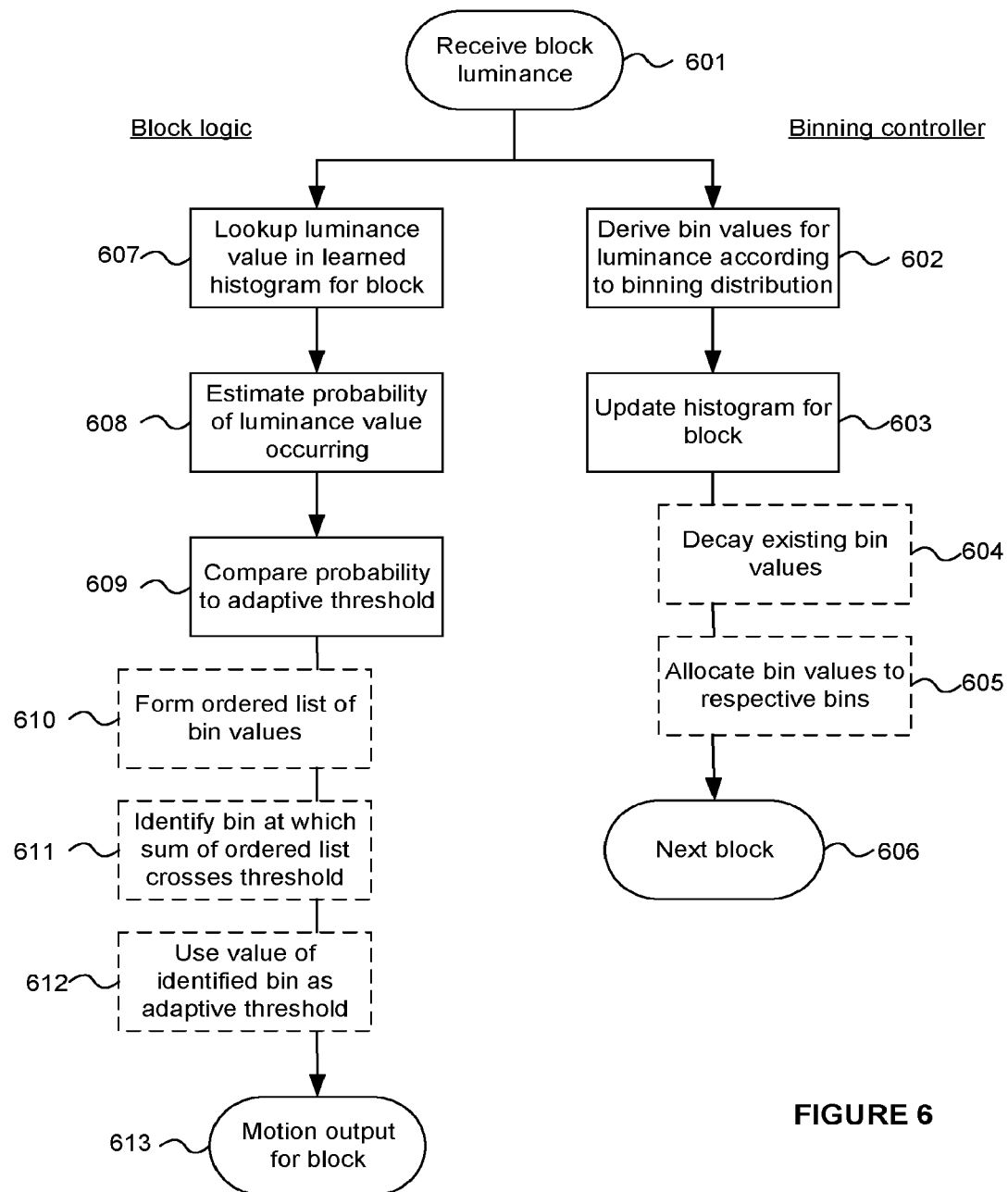
FIG. 6 is a flowchart illustrating the operation of a binning controller and motion detector according to a first aspect.

A flowchart illustrating an example of the operation of the motion detector 115 which includes the binning controller 109 is shown in FIG. 6. On receiving a luminance value for a block 601 (e.g. from camera module 101), the binning controller 109 and block logic 110 perform their respective functions in order to, respectively, maintain a histogram for the block and form a motion output for the block. The operation of the binning controller and block logic is described in more detail below. The binning controller and block logic may operate in any manner, including in series or concurrently/in parallel. Preferably however, the histogram of a block is used by the block logic prior to the binning controller updating the histogram with the received luminance value. The block logic 110 represents an example of change detection logic and the motion detector 115 an example of a data processing device for detecting a change in the input values on which it is configured to operate. In other examples the input values may not be received in respect of a block of a frame and could be, for example, audio samples in which a change in level is to be detected.

An example illustrating how binning controller 109 may maintain a histogram 112 at a memory 111 will now be described with respect to FIGS. 1 and 6. Memory 111 may be any kind of data store accessible to the motion detector 115; it may be internal or external to the data store and may comprise one or more storage elements. Each frame is divided into one or more blocks each comprising one or more pixels of the frame, and in respect of each block a 256 bin histogram is maintained at memory 111 by the binning controller.

Motion detector 115 may receive a measure of luminance for each block of a frame (601 in FIG. 6). In this example, each frame is divided into 16 non-overlapping blocks and the measure of luminance for each block is a measure of the average luminance over the pixels of the block as calculated by image processor 103. In this example, the binning controller 109 is configured to receive as image characteristics 108 from the camera module 101 sums of the red, green and blue channels over the pixels of each block of the image frame captured at the camera sensor 102. Such image characteristics are commonly available at a camera pipeline. The image characteristics or statistics may be calculated at image processor 103.

The motion detector 115 may process received image characteristics so as to form a luminance value or other value in respect of which a histogram is to be maintained for one or more blocks of a frame. This may be considered to form part of receiving the luminance for a block 601 in FIG. 6. For example, a luminance value, $Y_i$, may be calculated for the $i^{th}$ block of a frame as:

$$Y_i = \frac{0.299R_i + 0.587G_i + 0.114B_i}{N_{pixels}}, 0 \le i < N_{blocks} \quad (1)$$

where $R_i$, $G_i$ and $B_i$ are the sums of the red, green and blue values across the block which are received as image characteristics, $N_{pixels}$ is the number of pixels in the block and $N_{blocks}$ is the number of blocks the image is divided into. In the present example $N_{blocks}$=16. The luminance value, $Y_i$, will be referred to as the current luminance value.

The binning controller 109 is configured to maintain a histogram for one or more blocks of a frame which, for each block, represents the frequency distribution of luminance over time. On receiving a luminance value for a block, the binning controller updates the histogram for the block (603 in FIG. 6) with the received luminance value in the manner described below. Each bin of a block's histogram may be initialized with a value appropriate to the implementation. For example, for a histogram having 256 bins, each bin of a histogram could initially be set to:

$$h_j = \frac{1}{256}, 0 \le j \le 255 \quad (2)$$

On receiving a luminance value for a block, each bin of the histogram, hi', for that block is decayed (604 in FIG. 6) so as to down-weight historical bin values relative to the calculated luminance value. This may be performed before the luminance value is allocated to the histogram (605 in FIG. 6). For example, each bin of the histogram of a block may be decayed in dependence on a predefined or adaptive learning coefficient, learnCoeff which takes a value between 0 and 1:

$$h_j^{decayed} = (1 - \text{learnCoeff}) * h_j^{old}, 0 \le j \le 255 \quad (3)$$

Taking a simplistic approach, the $L_i^{th}$ histogram bin of the histogram for the $i^{th}$ block may then be updated using the current luminance value according to:

$$h_j^{new} = \text{learnCoeff} + h_j^{decayed}, \ j = Y_i \qquad (4)$$

where learnCoeff serves as the contribution of the current luminance value to its respective bin. A suitable value for learnCoeff may be empirically determined.

Over a number of frames, a non-parametric representation of the expected distribution of pixel values for a particular block may be built up which allows for complex multi-modal behaviour to be captured. However, as can be seen from the exemplary histogram shown in FIG. 2, the above simplistic approach tends to lead to a sparse histogram because of the limited number of image characteristics provided for each block and the narrow bins relative to the range of possible luminance values. In FIG. 2, the distribution of luminance values over the bins can be seen to be uneven with gaps 201 and peaks 202. In the present example, a single luminance value is provided, but in other examples more than one value of an image characteristic may be provided (e.g. different image characteristics may be provided for different areas of a block).

An improved approach to allocating image characteristics to the histogram bins will now be described. Rather than allocating each image characteristic received for a block to the respective bin of the corresponding histogram, each image characteristic is used to derive bin values for a plurality of histogram bins located about the respective bin in accordance with a binning distribution. This is 602 in FIG. 6. The binning distribution may be predefined (e.g. on initialisation of apparatus or binning controller) or defined dynamically (e.g. in dependence on characteristics generated by the image processor for captured frames). For example, in the present case in which a luminance value received for a block expresses a mean luminance over the pixels of the block, the actual luminance values within the block may be assumed to have a Gaussian distribution having a mean, μ, centred on the received value and having a predefined or adaptive standard deviation, σ. Thus, defining the binning distribution as a Gaussian, the bins of a histogram may be updated at 603 of FIG. 6 using:

$$h_j^{new} = \text{learnCoeff} * A e^{-\frac{(j-Y_i)^2}{2\sigma^2}} + h_j^{decayed}, \ Y_i - w \le j \le Y_i + w \qquad (5)$$

where w is the half width of the Gaussian kernel and $$\sigma = \frac{(w+1)}{3}.$$

By defining the standard deviation in this manner, the kernel may be precalculated into a buffer of length 2w+1. A is a normalization factor, for example:

$$A = \frac{1}{\sum_{k=-w}^{w} e^{-\frac{k^2}{2\sigma^2}}} \qquad (6)$$

The allocation of the derived bin values to their respective bins (605 in FIG. 6) may be performed after the bins of the histogram have been decayed (604 in FIG. 6)—e.g. according to equation 3 above. Once the bin values derived for a luminance value have been allocated to the histogram, the binning controller may move onto the next block (606 in FIG. 6) by performing the same steps in respect of a histogram maintained for that next block. A histogram 112 may be maintained at memory 111 for one or more blocks of a frame such that, as luminance values are received for the blocks of a sequence of frames, each histogram represents a learned distribution of the frequency of luminance values over time for the corresponding block.

A standard deviation for the binning distribution according to which bin values are derived may be determined empirically for a given system (e.g. through optimising the accuracy of the motion detection performed by motion detector 115 using the histograms generated by the binning controller). A standard deviation could be determined or defined for an entire frame or for any region of a frame (e.g. a standard deviation could be determined for each block of a frame, with the standard deviation determined for a block being used when binning values of that block). A standard deviation may be adaptively determined by the binning controller or at any other element of the camera module or motion detector—for example, by estimating a standard deviation from a histogram formed by simply binning luminance values (e.g. as discussed above with respect to FIG. 2). This allows a standard deviation to change as, for example, the scene and/or light conditions change. A standard deviation may be a statistic provided by the camera module (e.g. as a result of calculations performed at the image processor 103). A standard deviation need not be a true mathematical standard deviation and may be any suitable measure of the width of the underlying or expected distribution of the image characteristic.

The binning controller may be configured to receive multiple luminance values for a block, with each luminance value being binned at a histogram maintained for the block. The binning controller may be configured to receive multiple luminance values for a block, with each luminance value being binned at a separate histogram maintained for the respective luminance value of the block such that multiple histograms are maintained for the block. Each luminance value may be generated for a block in any manner: for example, each luminance value may be generated in respect of a different pixel or group of pixels of the block and/or each luminance value may be calculated in a different way (e.g. a different average of the same or different pixels of a block).

Figure 3:
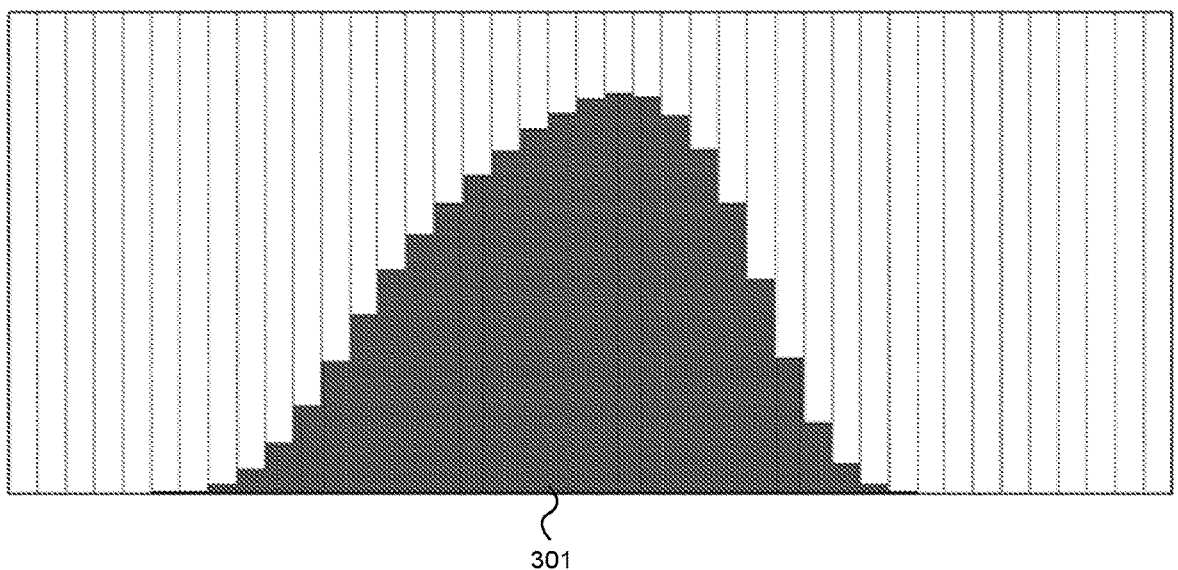
FIG. 3 illustrates a histogram formed in accordance with the principles described herein from the same set of luminance values represented in FIG. 2.

FIG. 3 shows a histogram 301 maintained by binning controller 109 such that luminance values received for a block are allocated to the block's histogram according to a Gaussian distribution. It can be seen that the histogram learned by the binning controller does not suffer from a sparsity of values and represents a better approximation to the true luminance probability distribution of a block. The binning controller may be configured to allocate luminance values using an approximation to a true Gaussian distribution. Generally, any suitable distribution may be used which is considered to provide sufficiently good performance for the particular application—for example, a triangular distribution or a rectangular distribution.

For image characteristics other than luminance, it may be appropriate to allocate image characteristics to histogram bins in accordance with distributions other than Gaussian distributions which reflect the underlying distribution of values of that image characteristic over a block.

In FIG. 1, binning controller 109 is shown as being part of a motion detector 115. This is merely an example and it will be appreciated that a binning controller need not be provided at a motion detector; a binning controller may be provided at any kind of apparatus, as a discrete unit, or in software.

A learned histogram 112 maintained at memory 111 for a block of a sequence of frames by the binning controller 109 may be used by the block logic 110 as a representation of the probability distribution of a particular luminance value occurring for a block. The probability of a received luminance value belonging to the histogram distribution, $P_{background}$, may be determined by the block logic 110 by means of a lookup into the learned histogram at the bin corresponding to the received luminance value. This is 607 in FIG. 6. The histogram may be a normalised version of the histogram:

$$P_{background}(Y_i) = h_{L_i}^{normalized} \quad (7)$$

where $$h_j^{normalized} = \frac{h_j}{\sum_{k=0}^{255} h_k} \quad (8)$$

Each histogram may be stored in normalised form at memory 111 or the normalised value of each bin may be calculated by the motion detector 115 (e.g. at block logic 110). For example, the sum of the bins $\Sigma_{k=0}^{255} h_k$ used in equation 8 may be stored with a histogram such that the normalised value of each histogram bin may be trivially formed from a stored histogram 112 by the motion detector according to equation 8.

Generally the block logic may be configured to form some measure of the likelihood of a received luminance value occurring given the frequency distribution represented by the histogram. This is 608 in FIG. 6. The likelihood need not be a true probability and may take any suitable range of values, not necessarily between 0 and 1.

The bin probability calculation may be performed using the histogram prior to a received luminance value being allocated to the histogram. Because the binning controller allocates luminance values to a histogram in accordance with some binning distribution, the histogram maintained for each block is smooth and can be directly sampled without the errors due to the uneven distribution (and hence inaccurate probabilities) which would occur with a sparse histogram.

The direct sampling of probabilities by the block logic 110 may not be entirely accurate because the incoming luminance value which is compared to the learned histogram has itself a distribution associated it. This can be addressed by assuming the same Gaussian distribution (or other distribution, as appropriate to the particular implementation) and convolving this with the sampled probabilities. The probability of an incoming luminance value belonging to the histogram distribution may then be calculated by the block logic as:

$$P_{background}(Y_i) = \sum_{j=Y_i-w}^{Y_i+w} h_j^{normalized} * Ae^{-\frac{(j-Y_i)^2}{2\sigma^2}} \quad (9)$$

Again, the distribution may be approximated. For example, if computational resources are severely limited, the distribution could be approximated with a box kernel:

$$P_{background}(Y_i) = \frac{1}{2w+1} \sum_{j=Y_i-w}^{Y_i+w} h_j^{normalized} \quad (10)$$

The block logic 110 uses the probability calculated in respect of a luminance value received for a block in order to determine whether a block is likely to represent motion or not. For example, the block logic may form a binary decision as to whether a luminance value received for a block indicates that the block contains motion (i.e. represents foreground in the captured scene), with a decision of foreground motion being $F_i=1$ and a decision that the block represents background being $F_i=0$. One approach is to compare the probability that a luminance value belongs to the histogram distribution maintained for that block (i.e. is background) to a predefined or adaptive threshold, T:

$$F_i = \begin{cases} 1 & P_{background}(Y_i) \leq T \\ 0 & P_{background}(Y_i) > T \end{cases} \quad (11)$$

A suitable threshold may be identified in any way, including: empirically determined; derived from the sequence of frames (e.g. as one or more statistics generated at the image processor); and adaptively calculated in any suitable manner. This is 609 in FIG. 6 in the case that the threshold is adaptive.

Using a predefined threshold does not typically take into account the possible multi-modal nature of the luminance probability distribution represented by a histogram. The more modes a block may be in, the less overall probability is assigned to each mode meaning a lower threshold value should be used; whereas for a single mode block a higher threshold is more appropriate. It is therefore preferred that an adaptively calculated threshold is used.

Figure 5:
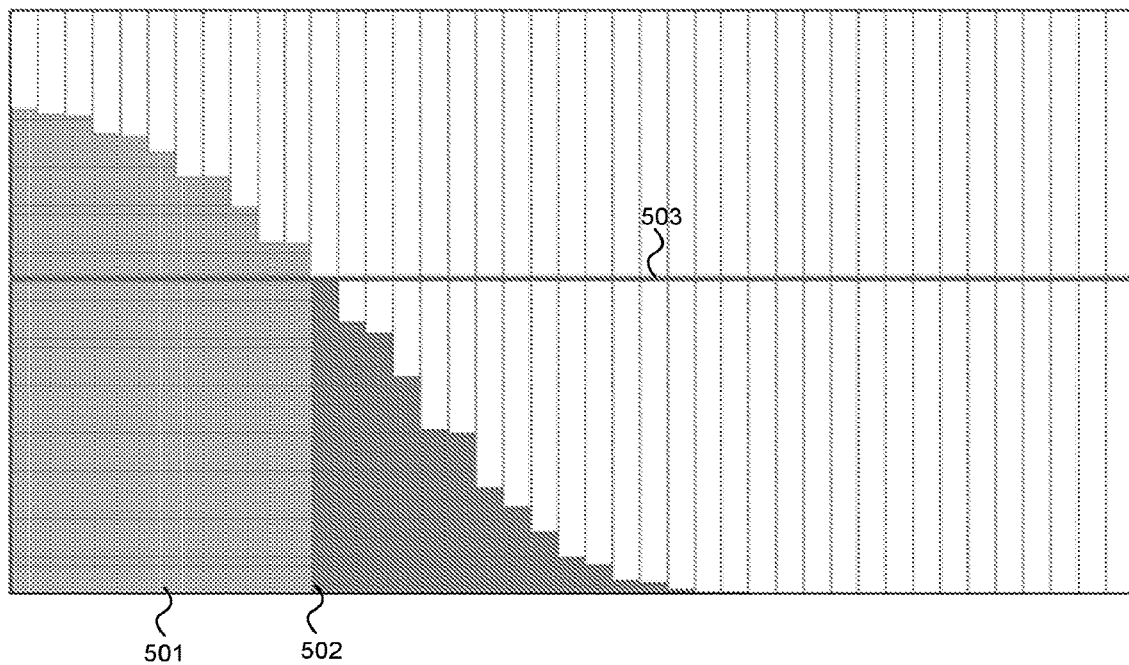
FIG. 5 illustrates the bin values of the histogram shown in FIG. 3 ordered by size.

For example, a suitable adaptive threshold may be determined as follows. A normalized histogram for a block is sorted into order of bin value as shown in FIG. 5 (which corresponds to the histogram of FIG. 3). This is 610 in FIG. 6. The bins of the histogram are then summed in order of decreasing bin value so as to identify a value for n which satisfies:

$$\Sigma_{k=0}^{n} h_k^{sorted} \leq T_{user} \quad (12)$$

where $T_{user}$ is a predefined threshold. This is 611 in FIG. 6. This threshold represents the total probability of a luminance value received for a block belonging to the histogram distribution (i.e. representing background in the scene captured by the camera sensor). It will be appreciated that the sorting step may not be explicitly performed and that the bins may be summed in order of decreasing bin value in any suitable manner. It will be appreciated that a high n indicates a spread out histogram whereas a low n indicates a tightly clustered histogram. Note that the 256 bins representing the histogram of FIG. 3 are represented schematically in FIGS. 3 and 5 by a smaller number of bins.

In FIG. 5, the sum of the first n bins corresponds to the sum of the bin values in the light shaded region 501 such that the threshold is crossed at bin 502: the value of this bin, which is indicated by line 503 in the figure, is taken as an adaptive threshold $T_{adaptive}$:

$$T_{adaptive} = h_{n+1}^{sorted} \quad (13)$$

This is 612 in FIG. 6. The adaptive threshold $T_{adaptive}$ may be used to identify whether a block represents motion according to:

$$F_i = \begin{cases} 1 & P_{background}(Y_i) \leq T_{adaptive} \\ 0 & P_{background}(Y_i) > T_{adaptive} \end{cases} \quad (14)$$

with a decision that a block represents foreground motion being $F_i=1$ and a decision that the block represents background being $F_i=0$. This is 613 in FIG. 6. A decision generated by the block logic represents a measure of the change in the luminance values received by the motion detector. In other examples the output of the block logic may represent a measure of the change in other input values. Generally a measure of change may be provided in any suitable manner and be expressed as values having any suitable range, including as a binary value as in the present example.

Where the probability of a luminance value belonging to the distribution represented by a histogram of a block is lower than the adaptive threshold, the block logic is configured to identify that block as representing motion in the captured scene. Otherwise the block logic is configured to identify the block as not representing motion in the captured scene. It will be apparent that the adaptive threshold will be lower for more spread out, multi-modal, probability distributions, and higher for more tightly clustered histograms.

Figure 7:
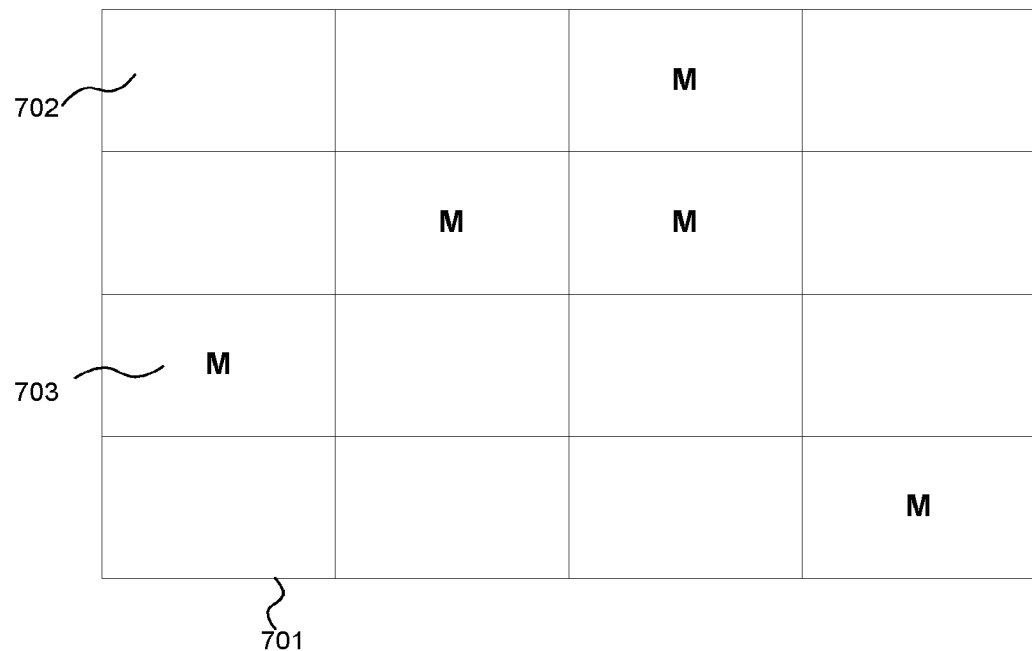
FIG. 7 illustrates a binary output from a motion detector operated on an image frame divided into a plurality of blocks.

By forming a binary decision as to whether each block of a frame is considered to represent motion, block logic 110 may store a motion matrix 114 in memory 111 which represents the block-wise motion determined to be present in a received frame. An example of the information held at stored matrix 114 is shown in FIG. 7 for a frame 701. The frame is divided into 16 blocks, with the motion matrix 114 indicating which of the blocks represents motion in the frame: blocks (e.g. 703) which are indicative of motion are labelled in the figure with an 'M', and blocks (e.g. 702) which are not indicative of motion are not labelled in the figure with an 'M'. These labels are merely illustrative in the figure; in general any indication of whether or not motion is determined to be present at a block may be used. Motion matrix 114 may represent motion information for one or more blocks of a frame in any suitable manner, including, for example, as a binary string, an array of values, or as information encoded into or associated with the frame itself. A motion matrix may or may not be a rectangular array of values.

In the above examples, luminance is provided to the motion detector 115 as the image characteristic on the basis of which motion is assessed in each block of a frame. However, using luminance can under certain conditions suffer from poor performance—for example, changes in lighting conditions in a scene can lead to false positive motion detections. More robust performance may be achieved using a measure of the spread of one or more components for a block (e.g. the red, green and blue channels of an RGB frame) and/or measure of the spread of the luminance of a block. A measure of spread may be any suitable measure of the variation in an image characteristic, such as a variance or a standard deviation.

An example will now be described with respect to FIG. 1 in which motion detection is performed by the motion detector on the basis of a spatial standard deviation formed for each of the red, green, and blue channels of a block. The camera module 101 is configured to provide as image characteristics 108 for each block of a frame the sum of the squared values over the pixels of the block for each of red, green and blue channels. From these sums it is possible to calculate the spatial standard deviation of each of the red, green and blue channels. For example, the standard deviation of the red channel within a block may be determined according to:

$$\sigma_{red} = \sqrt{\left(\frac{1}{N_{pixels}} \sum R_i^2\right) - \left(\frac{R_i}{N_{pixels}}\right)^2} \quad (15)$$

where $R_i$ are the red channel pixel values of the pixels of the block, and $N_{pixels}$ is the number of pixels in the block.

A compound spatial standard deviation for pixel values within a block may be calculated directly from the red, green and blue pixel values of each pixel. Such a compound spatial standard deviation could formed at the binning controller 109 so as to represent a standard deviation in the luminance of the block. For example, the standard deviation in the luminance of a block may be calculated at the binning controller from red, green and blue pixel values (or their squares) received as image characteristics:

$$\sigma_{luminance} = \sqrt{\left(\frac{0.299 \sum R^2 + 0.587 \sum G^2 + 0.114 \sum B^2}{N_{pixels}}\right)_i - Y_i^2} \quad (16)$$

where the luminance of a pixel $Y_i$ (or its square) may, for example, be received from the camera module 101 as an image characteristic 108 or calculated from red, green and blue pixel values (or their squares) received for each pixel.

The standard deviation in the luminance of a block a $\sigma_{luminance}$ may be used in place of a luminance value $Y_i$ in equations 2 to 14 above. Any of the examples, alternatives, or options described above with respect to FIGS. 1 to 7 and equations 1 to 14 to the use of luminance values apply mutatis mutandis to the use of standard deviation (or other measures of spread) in luminance or other image characteristics. Using standard deviation in place of luminance, the binning controller 109 is configured to maintain, for each block, a probability distribution of the spatial standard deviation in the luminance of the block. Thus, at each frame, the standard deviation received for a block is binned into the learned distribution for that block according to a binning distribution. The block logic 110 is configured to form a binary decision as to the presence or otherwise of motion in one or more blocks of a sequence of frames. The decision may be formed based on a predefined or adaptive threshold as described above.

In the examples described herein, decision logic 116 may be configured to use the motion information generated at the motion detector 115 (e.g. a motion matrix) for one or more blocks of a frame to form a motion output for a frame 117. For example, block logic 116 may be configured to identify motion in a frame when motion is detected in one or more blocks which lie within a defined area of interest, or motion may be identified when a predetermined contiguous number of blocks are indicative of motion. A motion output 117 for a frame may take any suitable form, including as a binary indication or some measure of the degree of motion observed in a frame (e.g. a number or proportion of blocks which the motion detector 115 has identified as being representative of motion).

The decision logic may further receive (e.g. along with or included in a motion matrix) measures of the likelihood of block luminance values (e.g. as formed at the block logic) occurring given the frequency distribution represented by a histogram formed by the binning controller for those blocks. This can allow the decision logic to further interpret the motion matrix formed for a frame. For example, the decision logic could be configured to check whether one or more blocks in which motion is not indicated in a motion matrix are surrounded in their respective frame by blocks in which motion is indicated in the motion matrix, and, if that is the case, interpret those surrounded blocks as also being indicative of motion if their respective measures of likelihood lie close to the predefined or adaptive threshold determined by the block logic.

A motion detector 115 configured according to the principles described herein may be embodied at a low power processor. A motion output for a block or frame (e.g. 117) generated by the motion detector or associated decision logic 117 may be arranged to wake up another processor, such as encoder 106. This particular example enables motion-activated recording to be implemented in an energy efficient manner.

A frame comprises a plurality of pixels each having an associated image characteristic. The term pixel is used herein to refer to any kind of image element in respect of which an image characteristic is calculated, sampled, sensed or otherwise formed. A pixel is not limited to having a one-to-one correspondence to a sensing element of a digital camera (e.g. a red, green or blue sensing element or a collection thereof). The term random as used herein encompasses both truly random and pseudorandom distributions, selections, or values; the term pseudorandom encompasses both truly random and pseudorandom distributions, selections, or values.

The camera module and motion detector of FIG. 1 are shown as comprising a number of functional blocks. This is schematic only and is not intended to define a strict division between different logic elements of such entities. Each functional block may be provided in any suitable manner. It is to be understood that intermediate values described herein as being formed by any of the entities of a camera module or motion detector need not be physically generated by the camera module or motion detector at any point and may merely represent logical values which conveniently describe the processing performed by the camera module or motion detector between its input and output.

The flowcharts of FIGS. 4 and 6 are schematic only. The spacing and relative position of the steps in the examples shown in those flowcharts is not to be taken as indicative of the precise time when each step occurs in absolute terms or relative to other steps. The flowcharts merely illustrate an exemplary order in which steps may be performed in accordance with the examples described herein.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture apparatus configured to perform any of the methods described herein, or to manufacture apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture apparatus for binning an input value into an array of bins will now be described with respect to FIG. 8.

Figure 8:
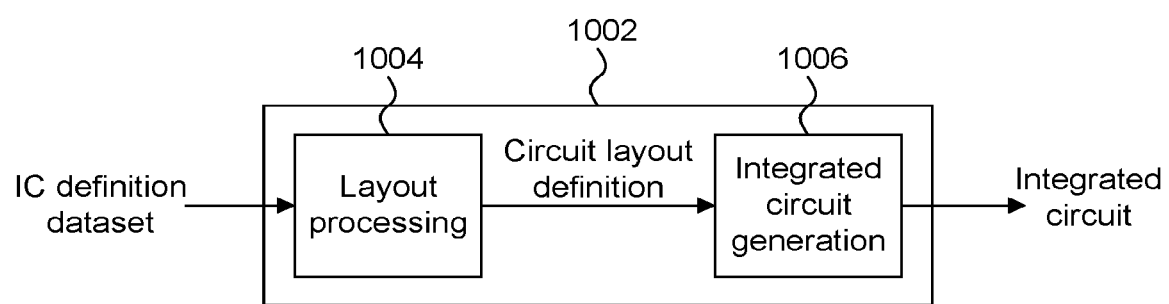
FIG. 8 is a schematic diagram of an integrated circuit manufacturing system.

FIG. 8 shows an example of an integrated circuit (IC) manufacturing system 1002 which comprises a layout processing system 1004 and an integrated circuit generation system 1006. The IC manufacturing system 1002 is configured to receive an IC definition dataset (e.g. defining apparatus as described in any of the examples herein), process the IC definition dataset, and generate an IC according to the IC definition dataset (e.g. which embodies apparatus as described in any of the examples herein). The processing of the IC definition dataset configures the IC manufacturing system 1002 to manufacture an integrated circuit embodying apparatus as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture apparatus without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A data processing device for detecting a change in a sequence of input values, the data processing device comprising:
   an input for receiving the input values;
   a binning controller configured to generate a histogram comprising an array of bins by, for each input value, allocating a bin contribution to each of a selected plurality of bins in the array centred on an input value bin; and
   change detection logic configured to use the histogram to estimate the likelihood of at least one of the received input values and generate a measure of change in the input values in dependence on the estimated likelihood.

2. The data processing device as claimed in claim 1, wherein the estimated likelihood represents a measure of probability of the at least one of the received input values occurring given the frequency distribution of input values represented by the histogram.

3. The data processing device as claimed in claim 2, wherein the change detection logic is configured to form the measure of probability in dependence on the value of the bin in the array corresponding to the at least one of the received input values.

4. The data processing device as claimed in claim 3, wherein the change detection logic is configured to derive a normalised histogram from the bins of the array and use the value of the bin of the normalised histogram which corresponds to the at least one of the received input values as the measure of probability.

5. The data processing device as claimed in claim 4, wherein the change detection logic is configured to derive the normalised histogram such that the bins of the histogram sum to 1.

6. The data processing device as claimed in claim 1, wherein the change detection logic is configured to generate the measure of change in the input values by comparing the estimated likelihood to a predefined or adaptive threshold.

7. The data processing device as claimed in claim 6, wherein the measure of change is indicative of a change in the sequence of input values if the estimated likelihood exceeds the predefined or adaptive threshold.

8. The data processing device as claimed in claim 6, wherein the change detection logic is configured to form the adaptive threshold by summing the bins in order of decreasing value and identifying a threshold bin at which that sum first exceeds a predefined total, and to derive the adaptive threshold in dependence on the value of the threshold bin.

9. The data processing device as claimed in claim 1, wherein the input values are at least one of:
   image characteristics received for a block of pixels of a frame and the data processing device is for detecting motion in the block of pixels; and
   audio characteristics received for an audio signal and the data processing device is for detecting a change in level in the audio signal.

10. The data processing device as claimed in claim 1, wherein the input values represent one or more of luminance, hue, lightness, brightness, chroma, colorfulness, saturation, or a measure of variation therein.

11. The data processing device as claimed in claim 1, configured to wake up a processor in dependence on the measure of change.

12. The data processing device as claimed in claim 1, wherein each bin contribution has a respective size dependent on a position of the bin contribution in a distribution spanning the selected plurality of bins.

13. The data processing device as claimed in claim 12, wherein the distribution is a Gaussian distribution or an approximation thereto.

14. The data processing device as claimed in claim 12, wherein the binning controller is configured to select the span of the distribution at least one of:
   according to one or more predefined or adaptive parameters; and
   in dependence on a measure of sparsity of the histogram.

15. The data processing device as claimed in claim 12, wherein the binning controller is configured to, for each input value, scale the distribution by the input value, the respective bin contribution to each of the selected plurality of bins being the scaled height of the distribution at the respective bin of the array.

16. The data processing device as claimed in claim 1, wherein each of the plurality of input values represents a physical characteristic received from one or more of a camera sensor or pipeline and an audio source.

17. The data processing device as claimed in claim 1, wherein the binning controller is configured to, prior to allocating the bin contribution to each of the selected plurality of bins, decay the values held at the array of bins according to a predefined decay factor.

18. The data processing device as claimed in claim 1, wherein each of the plurality of input values is received at the input expressed as a plurality of component values.

19. A method of detecting a change in a sequence of input values, the method comprising:
   receiving a plurality of input values;
   generating a histogram comprising an array of bins by, for each input value, allocating a bin contribution to each of a selected plurality of bins in the array centred on an input value bin; and
   estimating, using the histogram, a likelihood of at least one of the received input values and generating a measure of change in the input values in dependence on the estimated likelihood.

20. A non-transitory computer-readable storage medium having stored thereon a computer-readable dataset description of an integrated circuit that, when processed in an integrated circuit manufacturing system, causes the integrated circuit manufacturing system to manufacture a data processing device for detecting a change in a sequence of input values, the data processing device comprising:
   an input for receiving the input values;
   a binning controller configured to generate a histogram comprising an array of bins by, for each input value, allocating a bin contribution to each of a selected plurality of bins in the array centred on an input value bin; and
   change detection logic configured to use the histogram to estimate the likelihood of at least one of the received input values and generate a measure of change in the input values in dependence on the estimated likelihood;
   wherein the data processing device is embodied in hardware on an integrated circuit.

* * * * *